United States Patent [19]

Pfahl, Jr. et al.

[11] 3,866,307
[45] Feb. 18, 1975

[54] METHOD FOR SOLDERING, FUSING OR BRAZING

[75] Inventors: Robert Christian Pfahl, Jr., Chester; Hans Hugo Ammann, Morris, both of N.J.

[73] Assignees: Western Electric Company, Incorporated, New York, N.Y.; Bell Telephone Laboratories, Incorporated, Murray Hill, N.J.

[22] Filed: Sept. 7, 1973

[21] Appl. No.: 395,310

[52] U.S. Cl.................... 29/498, 228/37, 228/34
[51] Int. Cl....... B23k 31/02, B23k 1/08, B23k 1/00
[58] Field of Search .............. 29/498; 228/34, 37

[56] References Cited
UNITED STATES PATENTS

| | | | |
|---|---|---|---|
| 2,723,448 | 11/1955 | Miller | 29/498 X |
| 2,842,841 | 7/1958 | Schnable et al. | 29/498 X |
| 2,844,867 | 7/1958 | Wernz et al. | 29/498 X |
| 3,080,648 | 3/1963 | Thomas | 29/498 X |
| 3,263,325 | 8/1966 | Jacobson | 29/498 |
| 3,409,978 | 11/1968 | Grams | 29/498 |

*Primary Examiner*—Harrison L. Hinson
*Attorney, Agent, or Firm*—Jack Schuman

[57] ABSTRACT

Article to be soldered, fused or brazed is placed in hot saturated vapors generated by continuously boiling heat transfer liquid having selected properties including boiling point at least equal to, and preferably above, temperature required for operation. Vapors condense on article and give up latent heat of vaporization to heat article to temperature for soldering, fusing or brazing. Heat transfer liquid may be a fluorocarbon. Apparatus is shown for soldering, fusing or brazing a single article, a batch of articles, or a continuously moving line of articles. Specifically, mass reflow soldering and mass wave soldering operations are described.

17 Claims, 4 Drawing Figures

METHOD FOR SOLDERING, FUSING OR BRAZING

BACKGROUND OF THE INVENTION

1. Field of the Invention

This invention relates, broadly speaking, to an improved soldering, fusing or brazing method. More specifically, and with reference to a preferred embodiment, this invention relates to an improved soldering method wherein the article on which a soldering operation is to be performed is heated to a temperature appropriate for the soldering operation by condensing thereon hot saturated vapors of specific fluids, the method being particularly useful for conducting a plurality of simultaneous soldering operations such as reflow soldering or wave soldering on a line of printed circuit boards.

2. Description of the Prior Art

The present invention is particularly applicable to operations such as soldering, fusing or brazing requiring the application of heat to the article upon which the operation is to be performed to raise its temperature.

Although the present invention is not to be construed as limited to soldering, its background is most readily understood in the context of soldering.

Soldering operations require that the elements to be soldered be heated to a temperature sufficiently high to melt solder thereon, the said elements being protected from oxidation during the soldering step.

Conventionally, the well-known soldering iron has been used, the elements to be soldered being provided with a coating of flux on those areas being soldered to prevent oxidation during the soldering step. The soldering iron technique is not well suited to rapid mass soldering operations in which, for example, a single printed circuit board may have many closely spaced connections to be soldered.

Numerous suggestions have been made to provide soldering methods improving upon the conventional soldering iron technique and adapted for mass soldering requirements.

Thus, U.S. Pat. No. 3,359,132 (1967) to Wittmann discloses a process for solder-coating printed circuit boards wherein a layer of peanut oil is floated on a bath of molten solder. A circuit board, which has been provided with a coating of flux, is suspended in close proximity to the surface of the hot peanut oil and is held in such position so as to be preheated by a combination of radiation and air convection. Thereafter, the board is lowered through the layer of hot peanut oil into the molten solder bath in which soldering now takes place.

Other prior art of interest is listed below:
U.S. Pat. No. 2,869,497 (1959) to Lehner
U.S. Pat. No. 3,536,243 (1970) to Higgins
U.S. Pat. No. 3,612,388 (1971) to Wegener
U.S. Pat. No. 3,726,465 (1973) to Boynton

SUMMARY OF THE INVENTION

One of the objects of this invention is to provide an improved method for soldering, fusing or brazing, particularly for rapid and economical mass operations.

Another object of this invention is to provide an improved high-speed soldering operation for printed circuit boards which prevents heat damage to the printed circuit boards as well as to sensitive electrical components on the printed circuit boards.

A specific object of this invention is to provide an improved mass reflow soldering technique.

Another specific object of this invention is to provide an improved mass wave soldering technique.

Other and further objects of this invention will become apparent during the course of the following description and by reference to the accompanying drawings and the appended claims.

Briefly, I have discovered that the foregoing objects may be attained by continuously boiling a liquid having a boiling point at least equal to the temperature at which a soldering, fusing or brazing operation is to be performed, thereby to establish a body of hot saturated vapor in equilibrium with the boiling liquid, by introducing into the hot saturated vapors the article to be subjected to such soldering, fusing or brazing operation, by condensing onto such article a portion of the hot saturated vapors to heat the said article to the desired temperature by transfer of the heat of vaporization of the condensed vapors to the article, the last step being performed prior to or simultaneously with the soldering, fusing or brazing operation. More specifically, when soldering electrical components to a printed circuit board, a non-conducting, chemically stable and inert liquid having a boiling point above soldering temperature is chosen. The vapors of the liquid are non-oxidizing, and the condensate desirably has the property of flushing away any dirt or grime on the article.

BRIEF DESCRIPTION OF THE DRAWINGS

Referring now to the drawings in which like numerals represent like parts in the several views.

DESCRIPTION OF THE PREFERRED EMBODIMENTS

Figure 1:
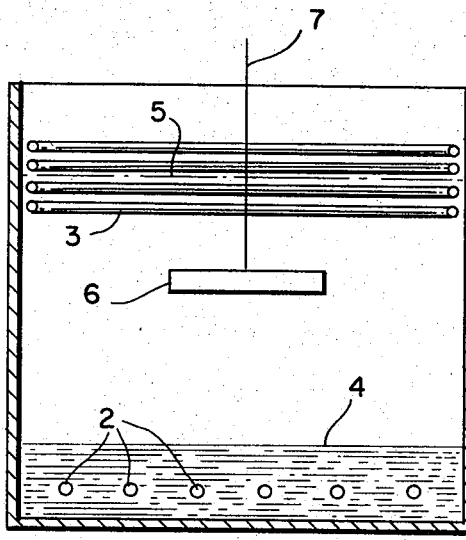
FIG. 1 represents diagrammatically a partially sectional view in elevation of an apparatus for practicing the present invention on a single article or on a batch of articles.

In the embodiment shown in FIG. 1, vessel 1 is provided with heating coils 2, advantageously electrically operated, adjacent the lower end thereof and cooling coils 3, receiving circulating cooling medium from a source not shown, adjacent the upper portion thereof. Heating coils 2 may be supplemented by an external source of heat applied to vessel 1 such as a hot plate (not shown). Heat transfer liquid 4 is introduced into vessel 1 to the level indicated and is brought to and maintained at its boiling point by means of heating coils 2. The hot saturated vapors from the boiling heat transfer liquid 4 fill the vessel 1 up to approximately the level of cooling coils 3, as indicated diagrammatically by the phantom line 5, the said cooling coils 3 condensing the vapor at this level and the condensate draining back to the lower portion of vessel 1. The hot saturated vapors, as will hereinafter appear, are much denser than air and this fact together with the action of cooling coils 3 serves to maintain the upper level of the hot saturated vapors no higher than about the level of the phantom line 5 and thus to prevent the hot saturated vapors or any substantial portion thereof, from escaping from vessel 1.

The embodiment of FIG. 1 (as well as the embodiments of FIGS. 2 and 3) will best be understood in relation to a specific example of a printed circuit board 6 having mounted thereon for soldering various electrical components (not shown). Criteria in selecting a heat transfer liquid 4 for this operation are:

a. It is necessary, for this application, that the heat transfer liquid 4 have a boiling point at least equal to, and preferably above the melting point of the solder. It is highly desirable that heat transfer liquid 4 have a sharply defined boiling point for better control over the process; for this reason, heat transfer liquid 4 should be a single-component, rather than multi-component, material.

b. It is highly desirable, for this application, that the heat transfer liquid be electrically non-conducting.

c. It is highly desirable, for this application, that the hot saturated vapors from the heat transfer liquid 4 be non-oxidizing, chemically stable and inert, non-toxic, non-inflammable, and relatively much denser than air.

d. It is highly desirable, for this application, that the heat transfer liquid have a relatively high latent heat of vaporization.

e. It is desirable, for this application, that the hot saturated vapors, when condensed, have the capability to degrease an object or the capability of carrying or flushing away from the object dirt and grime and the like.

After heat transfer liquid 4 meeting the foregoing criteria has been introduced into vessel 1 and brought to its boiling point by means of heating coils 2 thereby to substantially maintain said vessel 1 filled with hot saturated vapors, printed circuit board 6, with electrical components (not shown) mounted thereon for soldering, and which has been provided in the known manner with solder preforms or plating as required, is suspended by means of element 7 in the hot saturated vapors in vessel 1. Hot saturated vapors will condense on the printed circuit board 6, giving up latent heat of vaporization to heat the board 6 until the temperature of the board 6 reaches the temperature of the saturated vapor which is the boiling point of the heat transfer liquid 4, and which, as hereinbefore mentioned, is at least equal to, and preferably above, the melting point of solder. The board 6 will reach the temperature of the hot saturated vapor fairly rapidly, because heat transfer coefficients for condensation processes are among the highest known for any mode of heat transfer. At such temperature, the solder will melt or reflow to effect the soldering of the electrical components to the printed circuit board 6.

The very high rate of heat transfer from the condensed vapors to the board 6, permitting the soldering operation to be completed rapidly, results in an exposure of relatively short duration of the board 6 and attached electrical components to the elevated soldering temperature and therefore prevents heat damage to the said board 6 and electrical components which otherwise might occur under more prolonged exposure to such elevated temperature. With adequate vapor generating capacity of the apparatus (and it will be understood that heating coils 2, and auxiliary heating means such as a hot plate, if employed, are so sized as to be able to maintain the level of hot saturated vapor up to approximately phantom line 5 when board 6 is introduced into such hot saturated vapor), soldering times may range between approximately 5 seconds for typical light boards and components with low heat capacity to approximately 40 seconds for typical massive boards and components with high heat capacity. Vapors condensing on the printed circuit board 6 will drain back to the body of heat transfer liquid 4 in the lower portion of vessel 1, and, in so doing, may dissolve or carry away grease or dirt or the like which may be on the printed circuit board 6. It will be seen that heat transfer liquid 4 is continuously being distilled, that non-volatile contaminants remain in the body of liquid 4, and that the vapors which condense on the board 6 are relatively clean. The hot saturated vapors, being non-oxidizing, may eliminate in some instances any need for fluxing the printed circuit board 6. After the solder has melted or reflowed, the printed circuit board 6 may be removed from vessel 1 and cooled.

Although the operation hereinabove described for FIG. 1 has been based upon soldering one printed circuit board 6, it will be understood that a batch of printed circuit boards 6 may be introduced at one time into vessel 1 for simultaneous soldering.

For soldering electrical components to a printed circuit board 6 employing solder melting at 360° F. (182.2° C.), heat transfer liquid 4 advantageously is selected from the group of liquids known generically as fluorocarbons such as fluorinated polyoxypropylene. Such a liquid is sold by E. I. Du Pont de Nemours & Co. under the trademark "FREON E5" and has the following significant properties:

Boiling point at atmospheric pressure — 435.6° F. (224.2° C.)
Electrical resistivity — greater than $4 \times 10^{14}$ ohm-cm.
Dielectric constant — 2.45.
Latent heat of vaporization — 19.9 BTU/lb.
Density of saturated vapor at boiling point and atmospheric pressure — 1.45 lbs./ft.$^3$
Chemically stable, inert, non-toxic, non-inflammable.

Another suitable heat transfer liquid is sold by E. I. Du Pont de Nemours under the trademark "FREON E4" and has the following significant properties:

Boiling point at atmospheric pressure — 380.8° F (193.8° C.)
Electrical resistivity — greater than $4 \times 10^{14}$ ohm-cm.
Dielectric constant — 2.50.
Latent heat of vaporization — 22.5 BTU/lb.
Density of saturated vapor at boiling point and at atmospheric pressure — 1.40 lbs./ft.$^3$
Chemically stable, inert, non-toxic, non-inflammable.

Apparatus generally as shown in FIG. 1 was successfully operated according to the present invention. A Pyrex jar approximately 12 inches in diameter and 18 inches high was provided with two 500-watt immersion heaters supplemented by a 1,600-watt hot plate, and a water-cooled copper coil of six turns, was placed inside the jar around the circumference at the top to condense vapors, the coil having a temperature in the range 120°-160° F., thereby providing a vapor zone above the bottom of the jar of approximately 12 ½ inches. Liquid FREON E5 was introduced into the jar to cover the immersion heaters to a suitable depth, and was then brought to its boiling point, thus filling the jar with hot saturated vapors of FREON E5. A multilayer printed circuit board, with electrical components mounted thereto for soldering, with solder preforms and suitably fluxed, was lowered into the hot saturated vapors and held in such position until the solder preforms melted and effected a soldering of the electrical components to the multilayer board. Soldered connections of excellent quality were obtained.

It will be understood that the embodiment of FIG. 1 can, without modification, be used to effect solder fusing on a board. The board with the solder coating to be fused is fluxed and then simply inserted into the hot saturated vapors and held there until heated by condensation thereon of the vapors, the solder coating fusing at the temperature of the hot vapors.

It will further be understood that the embodiments of FIG. 1 can, without modification other than in selecting a suitable heat transfer liquid 4, be used for brazing, the heat transfer liquid 4 being chosen with a boiling point at least equal to, and preferably above, brazing temperature. The parts to be brazed are lowered into the hot saturated vapors until brazing occurs.

Figure 2:
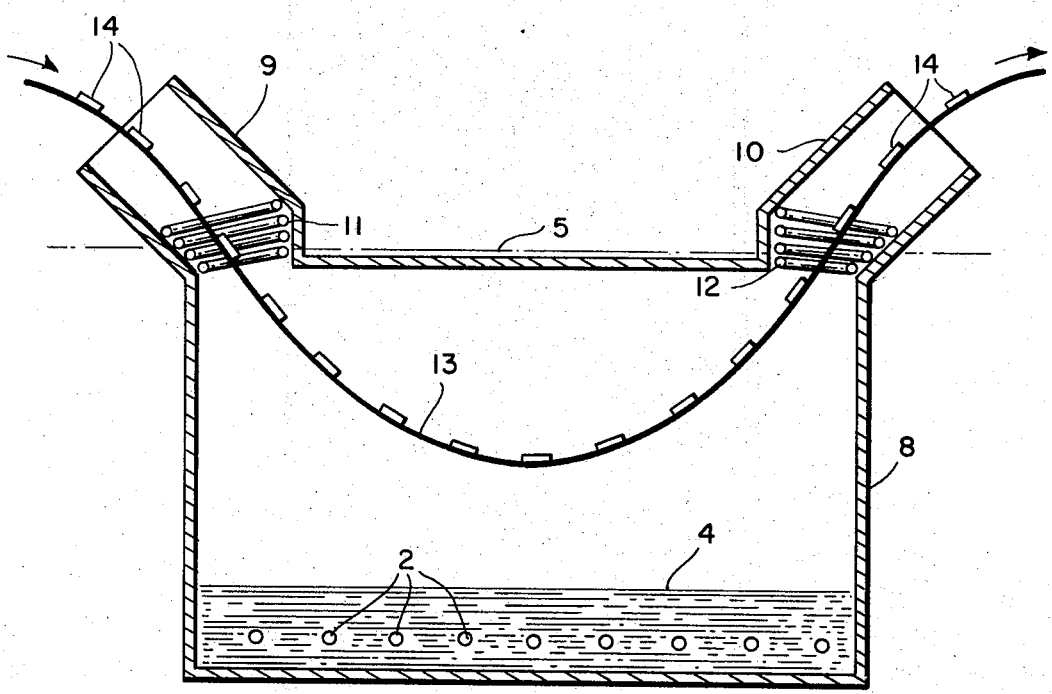
FIG. 2 represents diagrammatically a partially sectional view in elevation of apparatus for practicing the present invention on a continuously moving line of articles.

In the embodiment of FIG. 2, vessel 8 is provided with inlet and outlet conduits 9 and 10 at opposite ends thereof. Cooling coils 11 and 12 are provided in conduits 9 and 10, respectively, as shown, and receive circulating cooling medium from a source not shown. Conveyor means 13, adapted to carry articles 14 to be soldered, fused or brazed into and out of vessel 8, extends through cooling coil 11 and inlet conduit 9 into vessel 8 and out through cooling coil 12 and outlet conduit 10. Driving means, not shown, are provided to continuously move conveyor means 13 into and out of vessel 8, and conventional guide means, not shown, are provided to guide conveyor means 13 in the desired path.

In operating the embodiment of FIG. 2, heat transfer liquid 4, selected according to the criteria and desiderata previously enumerated in connection with the embodiment of FIG. 1, is introduced into vessel 8 to the level indicated and is brought to and maintained at its boiling point by means of heating coils 2, thereby maintaining vessel 8 filled with hot saturated vapors up to a level generally as indicated by phantom line 5. Articles 14 are placed on conveyor means 13, which is driven in the direction indicated by the arrows. The articles 14 are brought into the hot saturated vapors, are heated by condensation thereon of the vapors to the boiling point of the heat transfer liquid 4 and the desired soldering, fusing or brazing operation occurs, after which the articles 14 are conveyed out of vessel 8. The velocity of conveyor means 13 is chosen so that the dwelling time of articles 14 in vessel 8 is sufficient to permit the desired soldering, fusing or brazing operation to take place. The embodiment of FIG. 2 is particularly suited for rapid mass reflow soldering opeations on a continuously moving line of printed circuit boards or the like.

Figure 3:
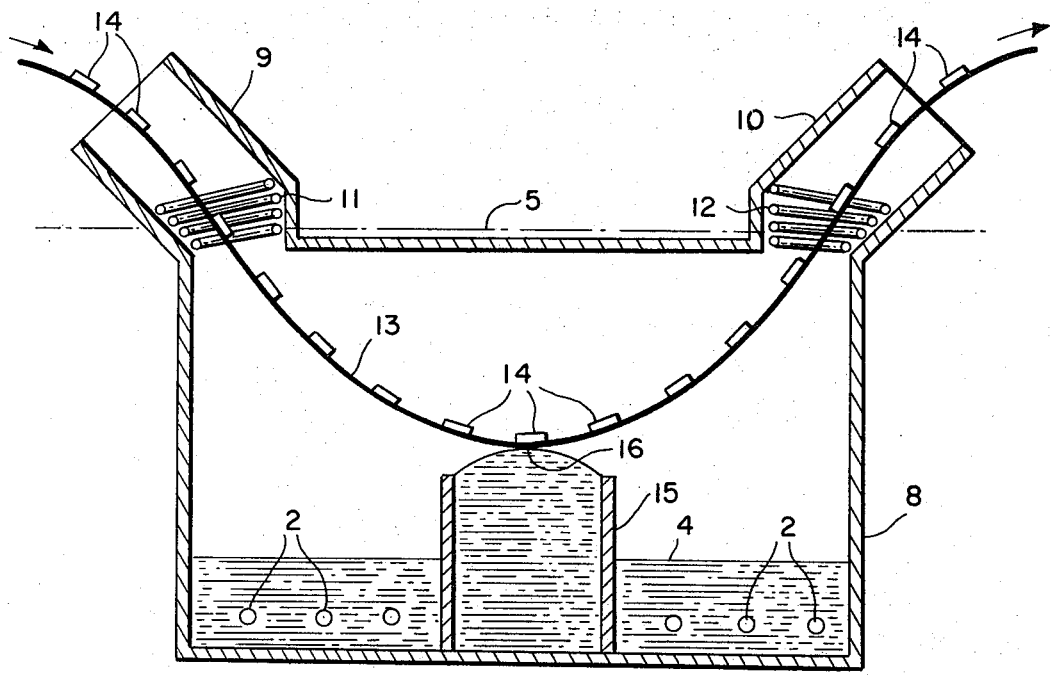
FIG. 3 represents diagrammatically a partially sectional view in elevation of apparatus in which a continuously moving line of articles is wave soldered according to the present invention.
Figure 4:
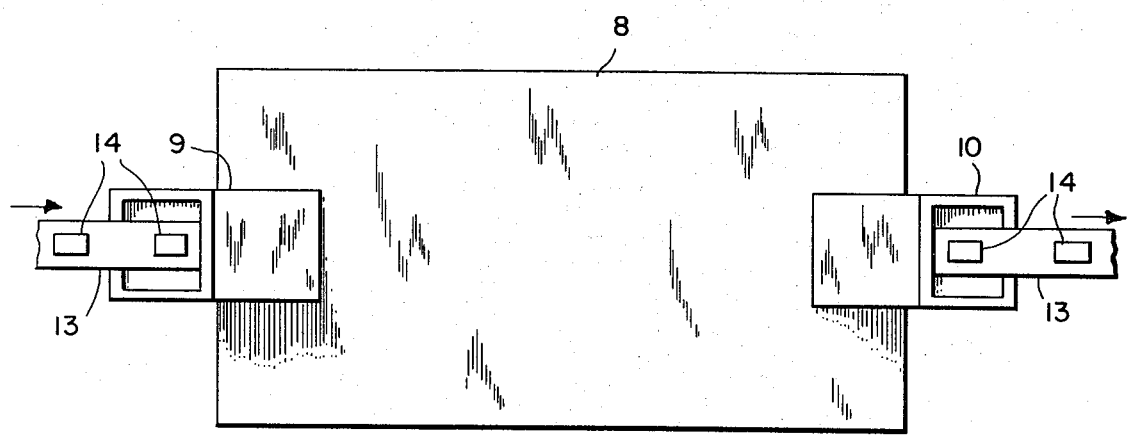
FIG. 4 represents a view in plan of the apparatus of FIGS. 2 and 3.

The embodiment of FIG. 3, which is particularly suited for mass wave soldering operations on a continuously moving line of printed circuit boards or the like, is similar to that of FIG. 2, with the addition of a wall or weir 15 bounding a conventionally generated solder wave or fountain as indicated diagrammatically. Examples of solder waves or fountains are shown, for example, in U.S. Pat. No. 3,536,243 (1970) to Higgins, U.S. Pat. No. 3,612,388 (1971) to Wegener and U.S. Pat. No. 3,726,465 (1973) to Boynton. It will be understood that in a solder wave or fountain, a wave 16 of molten solder projects upwardly beyond adjacent structure as shown diagrammatically in FIG. 3.

In operating the embodiment of FIG. 3, a wave 16 of molten solder is established and maintained preferably at a temperature above the boiling point of the heat transfer liquid 4 which, in turn, is above the melting point of solder. Conveyor means 13 is driven in the direction indicated by the arrows, and articles 14 to be wave soldered are placed thereon. Each article 14 enters vessel 8 through inlet conduit 9 at ambient temperature, and is then preheated by the latent heat of vaporization of the hot saturated vapors condensing thereon to a temperature in excess of the melting point of solder. This preheating causes any solder coating on the article 14 to melt so as to effect solder fusing which is desirable. The preheated article 14 then enters wave 16 of molten solder and is soldered therein. It will be seen that the solder wave or fountain is employed to provide solder to the article 14 and not heat, which allows better control over the process because heating and solder supply are separate processes. After the article 14 leaves the wave 16, the solder thereon including that supplied by the solder wave or fountain remains molten and thus can flow due to surface tension thereby to minimize solder defects. The article leaves vessel 8 through cooling coil 12 and outlet 10, whereupon the solder thereon freezes and solidifies.

Alternatively, heat transfer liquid 4 could be selected with a boiling point lower than the melting point of the solder. In operating the embodiment of FIG. 3 with such a heat transfer liquid 4, the article 14 would be preheated by hot saturated vapor and then further heated to the desired temperature by the solder wave 16 in which soldering takes place.

It will be seen from FIGS. 1–4 that the operations hereinabove described are, in the preferred embodiments, conducted at, or substantially at, atmospheric pressure. The present invention is not limited to operation at atmospheric pressure, and may be conducted at pressures below or above atmospheric pressure, the heat transfer liquid 4 being chosen so as to have a boiling point at the selected operating pressure at least equal to the temperature at which the operation is to be performed.

What is claimed is:

1. Method for performing on an article at elevated temperature an operation comprising the melting of material, said method comprising:
   a. continuously boiling substantially at atmospheric pressure a heat transfer liquid having a boiling point equal to the said elevated temperature and at least equal to the melting point of said material, thereby generating a body of saturated vapor of said heat transfer liquid at said elevated temperature;
   b. inserting said article into said body of saturated vapor;
   c. condensing saturated vapor directly on and in contact with said article thereby to heat said article to said elevated temperature by transfer of latent heat of vaporization from said condensed vapor to said article;
   d. performing said operation on said article.
2. Method as in claim 1 wherein:
   e. the operation performed on the article is soldering with solder, f. the boiling point of said heat transfer liquid is at least equal to the melting point of said solder.

3. Method as in claim 1 wherein:
 e. the operation to be performed on the article is fusing a coating of solder thereon,
 f. the boiling point of said heat transfer liquid is at least equal to the melting point of said solder.

4. Method as in claim 1 wherein:
 e. the operation to be performed on the article is brazing,
 f. the boiling point of said heat transfer liquid is at least equal to the melting point of the material being brazed.

5. Method as in claim 1 wherein:
 e. said saturated vapor is chemically inert.

6. Soldering a printed circuit board according to the method of claim 1 wherein:
 e. said heat transfer liquid is electrically non-conductive,
 f. said saturated vapor is chemically inert.

7. Method as in claim 1 wherein:
 e. said body of saturated vapor overlies said heat transfer liquid and is denser than air at ambient temperature and atmospheric pressure.

8. Method for performing on an article at elevated temperature an operation comprising the melting of material, said method comprising:
 a. establishing substantially at atmospheric pressure a body of saturated vapor at said elevated temperature extending to a predetermined height over a heat transfer liquid having a boiling point equal to said elevated temperature and at least equal to the melting point of said material by continuously boiling said heat transfer liquid,
 b. applying a cooling medium to said body of saturated vapor at said predetermined height to condense saturated vapor at said predetermined height and to substantially prevent said saturated vapor from rising above said predetermined height,
 c. inserting said article into said body of saturated vapor below said predetermined height,
 d. condensing saturated vapor directly on and in contact with said article thereby to heat said article to said elevated temperature by transfer of latent heat of vaporization from said condensed vapor to said article,
 e. performing said operation on said article,
 f. removing said article from said body of saturated vapor.

9. Method as in claim 8 further comprising:
 g. returning to said heat transfer liquid condensed vapors resulting from steps (b) and (d).

10. Method as in claim 8 wherein:
 g. the operation performed on the article is soldering with solder,
 h. the boiling point of the heat transfer liquid is at least equal to the melting point of said solder.

11. Method as in claim 8 wherein:
 g. the operation to be performed on the article is fusing a coating of solder thereon,
 h. the boiling point of said heat transfer liquid is at least equal to the melting point of said solder.

12. Method as in claim 8 wherein:
 g. the operation to be performed on the article is brazing,
 h. the boiling point of said heat transfer liquid is at least equal to the melting point of the material being brazed.

13. Method as in claim 8 wherein:
 g. said saturated vapor is chemically inert.

14. Soldering a printed circuit board according to the method of claim 8 wherein:
 g. said heat transfer liquid is electrically non-conductive,
 h. said saturated vapor is chemically inert.

15. Method as in claim 8 wherein:
 g. said saturated vapor is denser than air at ambient temperature and atmospheric pressure.

16. Wave soldering an article according to the method of claim 8, further comprising:
 g. generating a solder wave extending into the lower portion of said body of saturated vapor,
 h. passing said article through said solder wave.

17. Method according to claim 16 wherein:
 i. the temperature of said solder wave is higher than the temperature of said body of saturated vapors.

* * * * *